United States Patent
Crook et al.

(10) Patent No.: US 11,754,735 B2
(45) Date of Patent: Sep. 12, 2023

(54) SUBSURFACE CHARACTERISTIC MODELING

(71) Applicants: Three Cliffs Geomechanical Analysis Limited, Swansea (GB); Chevron U.S.A. Inc., San Ramon, CA (US)

(72) Inventors: Anthony James Lister Crook, Swansea (GB); Dean Andrew Thornton, Inverurie (GB); Jose I. Adachi, Houston, TX (US)

(73) Assignees: Three Cliffs Geomechanical Analysis Limited, Swansea (GB); Chevron U.S.A. Inc.

( * ) Notice: Subject to any disclaimer, the term of this patent is extended or adjusted under 35 U.S.C. 154(b) by 280 days.

(21) Appl. No.: 17/036,459

(22) Filed: Sep. 29, 2020

(65) Prior Publication Data

US 2022/0099853 A1    Mar. 31, 2022

(51) Int. Cl.
*G01V 1/30* (2006.01)
*E21B 49/00* (2006.01)

(52) U.S. Cl.
CPC ............ *G01V 1/306* (2013.01); *E21B 49/006* (2013.01); *G01V 2210/62* (2013.01); *G01V 2210/66* (2013.01)

(58) Field of Classification Search
CPC ...... E21B 49/006; G01V 1/282; G01V 1/306; G01V 99/005; G01V 2210/62; G01V 2210/66; G01V 2210/646; G01V 2210/663
See application file for complete search history.

(56) References Cited

U.S. PATENT DOCUMENTS

| | | | | |
|---|---|---|---|---|
| 8,423,337 | B2 * | 4/2013 | Hsu | E21B 49/006 166/250.03 |
| 8,515,720 | B2 * | 8/2013 | Koutsabeloulis | G01V 99/005 703/10 |
| 10,684,392 | B2 * | 6/2020 | Mookanahallipatna Ramasesha | G06F 30/20 |

(Continued)

FOREIGN PATENT DOCUMENTS

WO    2010047859    4/2010

OTHER PUBLICATIONS

Feng et al., "Quantitative Prediction of 3-D Multiple Parameters of Tectonic Fractures in Tight 1-15 Sandstone Reservoirs Based on Geomechanical Method", IEEE, Aug. 7, 2018, retrieved on [Nov. 14, 2021]. Retrieved from the internet <URL: https://ieeexplore.ieee.org/stamp/stamp.jsp?tp=&arnumber=8393459> entire document.

(Continued)

*Primary Examiner* — Feba Pothen
*Assistant Examiner* — Martin Walter Braunlich
(74) *Attorney, Agent, or Firm* — ESPLIN & ASSOCIATES, PC

(57) ABSTRACT

A subsurface representation that includes geometry and material properties of subsurface geological formations may be generated. To compute the initial (pre-production) state of stress, gravitational forces and tectonic forces may be applied to the subsurface representation. These loads may result in stress and displacement fields within the subsurface representation. The stress field may be calibrated against available measurements. At this point, the subsurface representation may be reinitialized by resetting the displacements within the subsurface representation while maintaining the stress field.

16 Claims, 6 Drawing Sheets

(56) References Cited

U.S. PATENT DOCUMENTS

| | | |
|---|---|---|
| 2011/0077918 A1 | 3/2011 | Mutlu |
| 2017/0205531 A1 | 7/2017 | Berard |
| 2017/0315249 A1* | 11/2017 | Myers .................... G06F 30/23 |
| 2018/0347320 A1 | 12/2018 | Renaudeau |
| 2018/0348400 A1 | 12/2018 | Hsu |
| 2020/0032623 A1* | 1/2020 | McClure ............. G06F 3/04847 |

OTHER PUBLICATIONS

PCT Search Report and Written Opinion for International Application No. PCT/US2021/050052, dated Dec. 15, 2021 (7 pages).

* cited by examiner

SUBSURFACE CHARACTERISTIC MODELING

FIELD

The present disclosure relates generally to the field of modeling subsurface characteristics.

BACKGROUND

Mechanical earth modeling may be used to forecast subsurface response variables (e.g., stress, strain, rock failure) before, during, and after hydrocarbon production. Variance in workflow of mechanical earth modeling may result in significant differences in computation of these subsurface response variables and on their inaccurate forecasting.

SUMMARY

This disclosure relates to modeling subsurface characteristics. Subsurface information and/or other information may be obtained. The subsurface information may define subsurface geological formations. A subsurface representation may be generated based on the subsurface information and/or other information. The subsurface representation may simulate geometry and properties of the subsurface geological formations. Gravitational forces may be simulated on the subsurface representation. Simulation of the gravitational forces on the subsurface representation may cause a stress field and a displacement within the subsurface representation. Tectonic forces may be simulated on the subsurface representation. Simulation of the tectonic forces on the subsurface representation may change the stress field and the displacement within the subsurface representation. A pre-production stress state of the subsurface geological formations may be simulated based on reinitialization of the subsurface representation and/or other information. The reinitialization of the subsurface representation may reset the displacement within the subsurface representation while maintaining the stress field within the subsurface representation.

A system that models subsurface characteristics may include one or more electronic storage, one or more processors and/or other components. The electronic storage may store subsurface information, information relating to subsurface geological formation, information relating to subsurface representation, information relating to gravitation forces, information relating to tectonic forces, information relating to stress field within subsurface representation, information relating to displacement within subsurface representation, information relating to pre-production stress state, and/or other information.

The processor(s) may be configured by machine-readable instructions. Executing the machine-readable instructions may cause the processor(s) to facilitate modeling subsurface characteristics. The machine-readable instructions may include one or more computer program components. The computer program components may include one or more of a subsurface information component, a subsurface representation component, a gravitational force component, a tectonic force component, a reinitialization component, and/or other computer program components.

The subsurface information component may be configured to obtain subsurface information and/or other information. The subsurface information may define subsurface geological formations. In some implementations, the subsurface information may define shapes and/or material properties of the subsurface geological formations.

The subsurface representation component may be configured to generate a subsurface representation based on the subsurface information and/or other information. The subsurface representation may simulate geometry, properties, and/or other characteristics of the subsurface geological formations.

The gravitational force component may be configured to simulate gravitational forces on the subsurface representation. Simulation of the gravitational forces on the subsurface representation may cause a stress field, a displacement, and/or other changes within the subsurface representation.

The tectonic force component may be configured to simulate tectonic forces on the subsurface representation. Simulation of the tectonic forces on the subsurface representation may change the stress field and/or the displacement within the subsurface representation.

In some implementations, a calibration of the subsurface representation may be performed based on a comparison of the stress field within the subsurface representation and a desired stress field.

The reinitialization component may be configured to simulate a pre-production stress state of the subsurface geological formations based on reinitialization of the subsurface representation and/or other information. The reinitialization of the subsurface representation may reset the displacement within the subsurface representation while maintaining the stress field within the subsurface representation.

In some implementations, resetting the displacement within the subsurface representation may include restoring the geometry of the subsurface geological formations existing prior to the simulations of the gravitational forces and the tectonic forces on the subsurface representation. In some implementations, maintaining the stress field within the subsurface representation may include removing stress from the subsurface representation and ramping the stress back to values of the stress field.

In some implementations, at least some of the displacement within the subsurface representation may remain after an initial reinitialization of the subsurface representation. The reinitialization of the subsurface representation may be repeated until a reduced displacement within the subsurface representation is acceptable. In some implementations, the reduced displacement within the subsurface representation may be acceptable based on the subsurface representation not including any displacement.

In some implementation, a material simulated within the subsurface representation may be changed from a linear material to a non-linear material for the reinitialization of the subsurface representation. In some implementations, contacting forces between different subsurface geological formations may be simulated to change the stress field and the displacement within the subsurface representation.

In some implementations, a salt material may be simulated within the subsurface representation. A temperature field may be applied to the subsurface representation to control a behavior of the salt material.

In some implementations, changes in stress and/or one or more properties of the subsurface geological formations may be modeled using the pre-production stress state of the subsurface geological formations and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

The present disclosure relates to modeling subsurface characteristics. A subsurface representation that includes geometry and material properties of subsurface geological formations may be generated. To compute the initial (pre-production) state of stress, gravitational forces and tectonic forces may be applied to the subsurface representation. These loads may result in stress and displacement fields within the subsurface representation. The stress field may be calibrated against available measurements. At this point, the subsurface representation may be reinitialized by resetting the displacements within the subsurface representation while maintaining the stress field.

Figure 1:
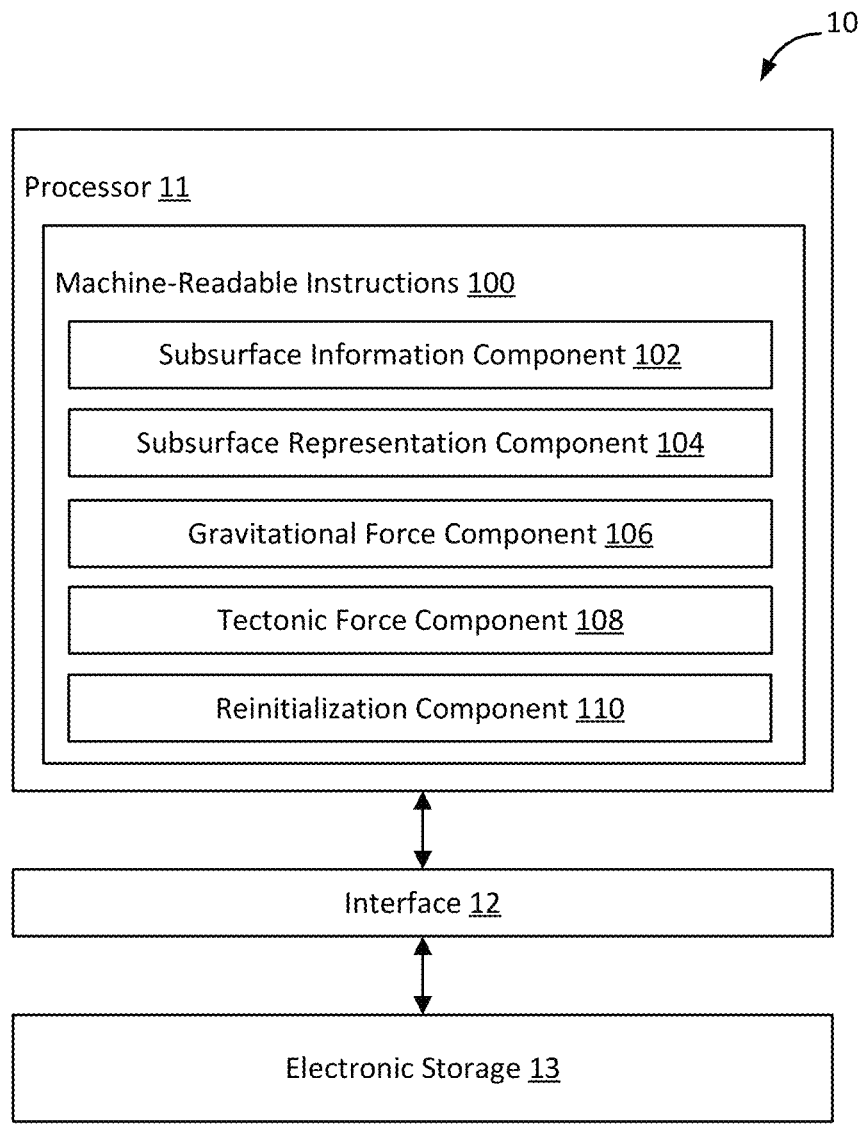
FIG. 1 illustrates an example system that models subsurface characteristics.

The methods and systems of the present disclosure may be implemented by and/or in a computing system, such as a system 10 shown in FIG. 1. The system 10 may include one or more of a processor 11, an interface 12 (e.g., bus, wireless interface), an electronic storage 13, and/or other components. Subsurface information and/or other information may be obtained by the processor 11. The subsurface information may define subsurface geological formations. A subsurface representation may be generated by the processor 11 based on the subsurface information and/or other information. The subsurface representation may simulate geometry and properties of the subsurface geological formations. Gravitational forces may be simulated by the processor 11 on the subsurface representation. Simulation of the gravitational forces on the subsurface representation may cause a stress field and a displacement within the subsurface representation. Tectonic forces may be simulated by the processor 11 on the subsurface representation. Simulation of the tectonic forces on the subsurface representation may change the stress field and the displacement within the subsurface representation. A pre-production stress state of the subsurface geological formations may be simulated by the processor 11 based on reinitialization of the subsurface representation and/or other information. The reinitialization of the subsurface representation may reset the displacement within the subsurface representation while maintaining the stress field within the subsurface representation.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store subsurface information, information relating to subsurface geological formation, information relating to subsurface representation, information relating to gravitation forces, information relating to tectonic forces, information relating to stress field within subsurface representation, information relating to displacement within subsurface representation, information relating to pre-production stress state, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate modeling subsurface characteristics. The machine-readable instructions 100 may include one or more computer program components. The machine-readable instructions 100 may include one or more of a subsurface information component 102, a subsurface representation component 104, a gravitational force component 106, a tectonic force component 108, a reinitialization component 110, and/or other computer program components.

The subsurface information component 102 may be configured to obtain subsurface information and/or other information. Obtaining subsurface information may include one or more of accessing, acquiring, analyzing, determining, examining, identifying, loading, locating, opening, receiving, retrieving, reviewing, selecting, storing, utilizing, and/or otherwise obtaining the subsurface information. The subsurface information component 102 may obtain subsurface information from one or more locations. For example, the subsurface information component 102 may obtain subsurface information from a storage location, such as the electronic storage 13, electronic storage of a device accessible via a network, and/or other locations. The subsurface information component 102 may obtain subsurface information from one or more hardware components (e.g., a computing device, a component of a computing device) and/or one or more software components (e.g., software running on a computing device). Subsurface information may be stored within a single file or multiple files.

The subsurface information may define subsurface geological formations. A subsurface geological formation may refer to a geological formation located beneath the surface/located underground. A geological formation may refer to a fundamental unit of lithostratigraphy. A geological formation may include rock strata with comparable lithology, facies, and/or or similar properties. For example, a geological formation may refer to a grouping of rocks. For instance, the subsurface information may define layers of rock located underground. The subsurface information may define other subsurface structures, such as faults that run through one or more layers of rock.

The subsurface information may define one or more characteristics of the subsurface geological formations. Characteristics of the surface geological formations may refer to attributes, features, quality, and/or characteristics of the subsurface geological formations. For example, the subsurface information may define materials that make up the subsurface geological formations and/or how those materials are physically/spatially arranged. For instance, the subsurface information may define shapes and/or material properties of the subsurface geological formations. Shapes of the subsurface geological formation may refer to form, outline, appearance, and/or arrangement of the subsurface geological formation. For example, the subsurface information may define the shapes of layers of rock and how those layers are arranged on top of and/or next to each other. Material properties of the subsurface geological formation may refer to qualities or traits of materials that makeup the subsurface geological formation. For example, the subsurface information may define the density, porosity, stiffness (e.g., Young's modulus, elastic modulus, shear modulus, Poisson's ratio), strength parameter, strength envelope, pore pressure, temperature profile, tectonic boundary condition, and/or other material properties of the subsurface geological formation.

The subsurface information may define subsurface geological formations by including information that describes, delineates, identifies, is associated with, quantifies, reflects, sets forth, and/or otherwise defines one or more of content, quality, attribute, feature, and/or other aspects of the subsurface geological formations. The subsurface information may be stored in one or more formats. A format may refer to one or more ways in which the information is arranged/laid out (e.g., file format). For example, the subsurface information may be stored in one or more formats corresponding to subsurface logs and/or seismic data. As another example, the subsurface information may be stored as a simulation/modeling software file (e.g., ABAQUS file). Other types and storage of subsurface information are contemplated.

The subsurface representation component 104 may be configured to generate a subsurface representation based on the subsurface information and/or other information. A subsurface representation may refer to a computer-generated representation of a subsurface region, such as a one-dimensional, two-dimensional and/or three-dimensional model of the subsurface region. A subsurface region may refer to a part of earth located beneath the surface/located underground. A subsurface region may refer to a part of earth that is not exposed at the surface of the ground.

The subsurface representation component 104 may generate a subsurface representation using one or more subsurface models. A subsurface model may refer to a computer model (e.g., program, tool, script, function, process, algorithm) that generates subsurface representations. For instance, some or all of the subsurface information may be used as input into the subsurface model(s) to generate a subsurface representation. The subsurface representation component 104 may generate a subsurface representation using one or more conversion tools. A conversion tool may refer to software that converts information stored in one format to another. For instance, the subsurface information may be stored as a simulation/modeling software file, and the subsurface representation component 104 may convert some or all of the subsurface information into a different format. Other generation of subsurface representation are contemplated.

The subsurface representation may simulate one or more characteristics of a subsurface region (subsurface characteristics). The subsurface representation may simulate subsurface characteristics by including features that imitate and/or represent the subsurface characteristics. A characteristic of a subsurface region may refer to an attribute, a feature and/or a quality of the subsurface region. For example, subsurface representation may simulate geometry, properties, and/or other characteristics of the subsurface geological formations. Geometry of the subsurface geological formation may refer to shape and/or relative arrangement of the subsurface geological formations. Properties of the subsurface geological formations may refer to qualities, attributes, characteristics, and/or features of materials that make up the subsurface geological formations (e.g., identity of materials that make up the subsurface geological formation and properties of the materials).

For example, the subsurface representation may include a multi-dimensional (e.g., 2D, 3D, 4D) model of a subsurface region including the subsurface geological formations. The model may be built on a grid/mesh, with lines and/or surfaces on the grid/mesh defining the surfaces of the subsurface geological formations. The areas and/or volumes within the surfaces may be filled with features that simulate the materials of the subsurface geological formations.

The gravitational force component 106 may be configured to simulate gravitational forces on the subsurface representation. Gravitational forces may refer to attracting forces between two masses. Gravitational forces may refer to force of gravity on subsurface materials due to the mass of the earth. Simulating gravitational forces on the subsurface representation may include imitating how the components of the subsurface representation changes due to the application of gravitational forces on the components. For example, simulating gravitational forces on the subsurface representation may include imitating how the subsurface geological formations changes and/or comes into equilibrium after gravitational forces are applied to the subsurface geological formations. For example, simulating gravitational forces on the subsurface representation may include imitating how the subsurface materials are impacted by weight of rock layers arranged on top of each other.

Simulation of the gravitational forces on the subsurface representation may cause a stress field, a displacement, and/or other changes within the subsurface representation. A stress field may refer to a distribution of internal forces in the subsurface representation that balance a set of external forces, such as the gravitational forces (e.g., stress due to weight of the rock layers). A stress field caused by the simulation of the gravitational forces may be a component of the stress to be simulated within the subsurface representation. Displacement may refer to movement within the subsurface representation due to a set of external forces, such as movement of the subsurface geological formations (e.g., movement of rock layers). Displacement caused by the simulation of the gravitational forces may be artificial displacement to be removed from the subsurface representation. For example, simulation of the gravitational forces on the subsurface geological formations (e.g., rock layers) may provide information on amount and/or extent of stress on materials within the subsurface geological formations due to the mass/weight of materials within the subsurface geological formations. However, the simulation of the gravitational forces on the subsurface geological formations may change the geometry of the subsurface geological formations, and such change in the geometry of the subsurface geological formations may be undesirable.

Figure 3A:
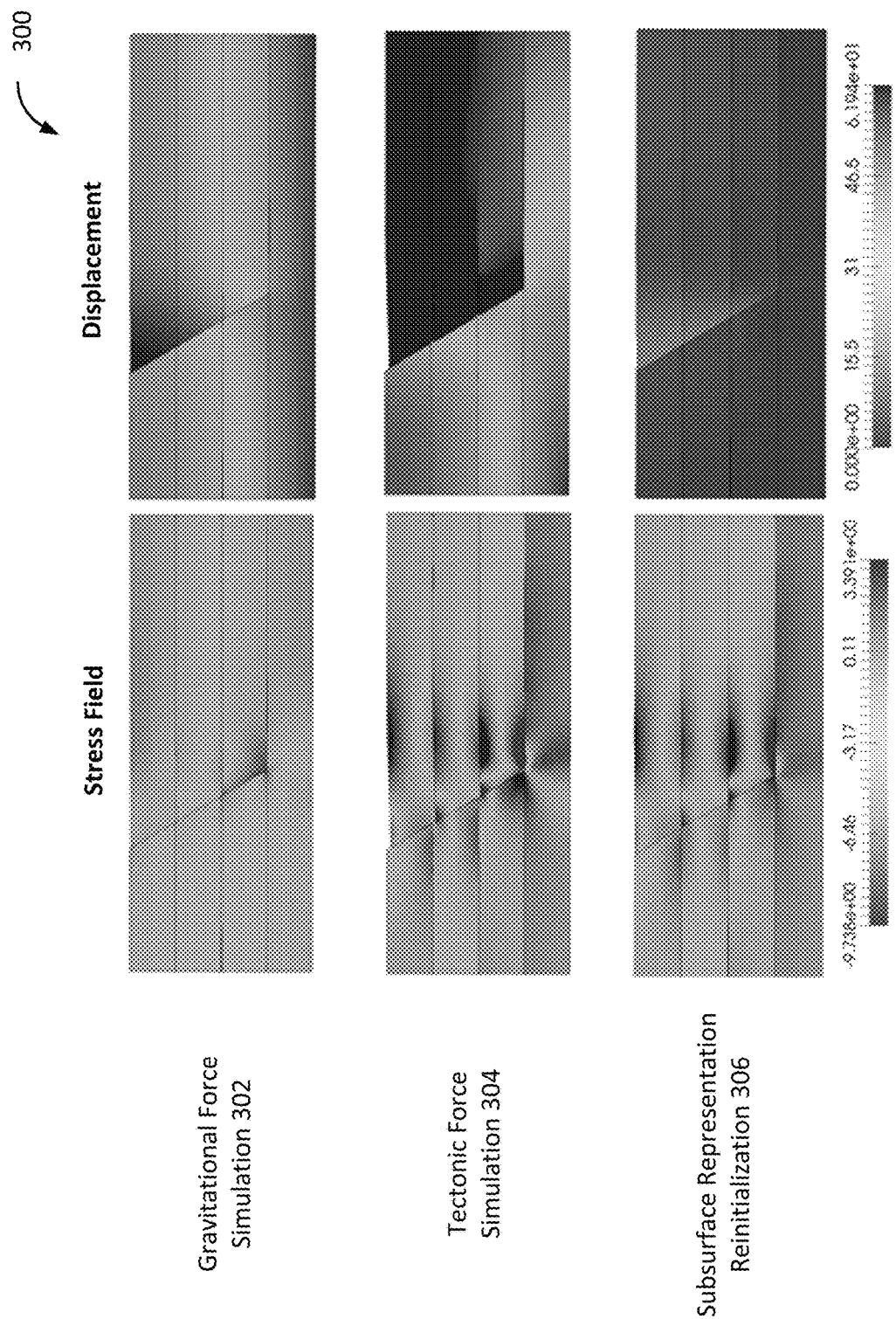
FIGS. 3A, 3B, and 3C illustrate example changes in stress field and displacement within a subsurface representation.

FIG. 3A illustrates example changes in stress field and displacement within a subsurface representation. The subsurface representation may include four geological formations (e.g., layers of rock), with a fault running through the top three geological formations. Contacts between the subsurface geological formations may include horizontal contacts between the four geological formations (e.g., bedding planes) and the vertical contacts along the fault. Simulation of the gravitational forces on the subsurface representation may cause a stress field and a displacement shown as the result of gravitational force simulation 302. The stress field may indicate horizontal stresses and/or forces within the subsurface geological formations. The displacement may show the amount of movement in the subsurface due to the application of gravitational forces.

The tectonic force component 108 may be configured to simulate tectonic forces on the subsurface representation. Tectonic forces may refer to forces that move tectonics plate and/or forces resulting from movement of tectonic plates. Tectonic forces may lift, lower, push, pull, and/or otherwise deform geological formations. Simulating tectonic forces on the subsurface representation may include imitating how the components of the subsurface representation changes due to the application of tectonic forces on the components. For example, simulating tectonic forces on the subsurface representation may include imitating how the subsurface geological formations changes and/or comes into equilibrium after tectonic forces are applied to the subsurface geological formations. For example, simulating tectonic forces on the subsurface representation may include imitating how the subsurface materials are impacted by application of horizontal compression and/or extension to the boundary of the subsurface representation (e.g., boundary of the grid/mesh).

Simulation of the tectonic forces on the subsurface representation may change the stress field and/or the displacement within the subsurface representation. The change in the stress field caused by the simulation of the tectonic forces may be a component of the stress to be simulated within the subsurface representation. The resulting stress field (stress field due to gravitational force simulation and tectonic force simulation) may be used as a pre-production stress field. The change in the displacement caused by the simulation of the tectonic forces may be artificial displacement to be removed from the subsurface representation. For example, simulation of the tectonic forces on the subsurface geological formations (e.g., rock layers) may provide information on amount and/or extent of stress on materials within the subsurface geological formations due to the tectonic movement history for the subsurface geological formations. However, the simulation of the tectonic forces on the subsurface geological formations may change the geometry of the subsurface geological formations, and such change in the geometry of the subsurface geological formations may be undesirable.

Referring to FIG. 3A, simulation of the tectonic forces on the subsurface representation may cause a stress field and a displacement shown as the result of tectonic force simulation 304. Simulation of the tectonic forces on the subsurface representation may change the stress field and the displacement from those shown as the result of the gravitational force simulation 302 into those shown as the result of tectonic force simulation 304.

In some implementations, a calibration of the subsurface representation may be performed based on a comparison of the stress field within the subsurface representation and a desired stress field. A desired stress field may refer to a stress field that is desired to be simulated within the subsurface representation. The stress field within the subsurface representation may be compared with the desired stress field to determine the difference between the stress field within the subsurface representation and the desired stress field. The calibration of the subsurface representation may be performed based on the difference between the stress field within the subsurface representation and the desired stress field being larger than desired (e.g., greater difference than a threshold difference). The calibration of the subsurface representation may include changes in the subsurface representation and/or the simulation of the subsurface representation to bring the stress field within the subsurface representation (after gravitational and tectonic force simulation) closer to the desired stress field. For example, the calibration of the subsurface representation may include one or more change in the tectonic force simulation (e.g., changing amount and/or direction of tectonic push/pull), changes in subsurface material properties, changes in boundary conditions, and/or other changes in the subsurface representation and/or the simulation of the subsurface representation.

The calibration of the subsurface representation may be performed once or multiple times for the subsurface representation. For example, the calibration of the subsurface representation may be performed after simulation of the gravitational forces and the tectonic forces. The calibration of the subsurface representation may be performed after (artificial) displacement within the subsurface representation has been removed. Other calibration of the subsurface representation are contemplated.

The reinitialization component 110 may be configured to simulate a pre-production stress state of the subsurface geological formations based on reinitialization of the subsurface representation and/or other information. The reinitialization of the subsurface representation may include modifying the subsurface representation to restore the geometry of the subsurface geological formations. The reinitialization of the subsurface representation may reset the displacement within the subsurface representation while maintaining the stress field within the subsurface representation. Resetting the displacement within the subsurface representation may include restoring the geometry of the subsurface geological formations existing prior to the simulations of the gravitational forces and the tectonic forces on the subsurface representation. That is, the subsurface geological formations may be reset back to their initial configuration within the subsurface representation.

In some implementations, maintaining the stress field within the subsurface representation may include removing stress from the subsurface representation and ramping the stress back to values of the stress field. The stress within the subsurface representation may be set to zero, and the value of the stress at different locations within the subsurface representation may be increased back to the values of the stress field (values of the stress field after gravitation force and tectonic force simulation).

The reinitialization of the subsurface representation may remove the artificial displacement of the subsurface geological formations caused by the gravitational and tectonic force simulation while preserving the stress field caused by the gravitational and tectonic force simulation. Thus, the gravitational and tectonic force simulation may be used to obtain the desired stress field within the subsurface representation, and the artificial displacement caused the gravitational and tectonic force simulation may be removed from the subsurface representation. The resulting stress field within the subsurface geological formations may simulate a pre-production stress state (pre-production stress snapshot) of the subsurface geological formations.

In some implementations, at least some of the displacement within the subsurface representation may remain after an initial reinitialization of the subsurface representation. That is, the initial reinitialization of the subsurface representation may not completely restore the geometry of the subsurface geological formations. When the displacement is reset, the subsurface representation may need to be brought back into equilibrium, which may require adjustment of stress and displacement within the subsurface representation. That is, after the displacement is reset, stress may be adjusted, and the subsurface geological formations may move to reach an equilibrium state. For example, referring to FIG. 3A, reinitialization of the subsurface representation may cause a stress field and a displacement shown as the result of subsurface representation reinitialization 306. Reinitialization of the subsurface representation may reset the displacement within the subsurface representation while maintaining the stress field within the subsurface representation. The stress field may change and displacement within the subsurface representation may occur to bring the subsurface geological formations into equilibrium.

The reinitialization of the subsurface representation may be repeated until a reduced displacement within the subsurface representation is acceptable. The displacement within the subsurface representation may be reduced while maintaining force-equilibrium with the stress field calculated from gravitational force and tectonic force simulation. Individual reinitialization of the subsurface representation may reduce the amount of displacement within the subsurface representation (existing displacement after the subsurface representation has reached equilibrium). The reinitialization of the subsurface representation may be repeated until the reduced displacement within the subsurface representation satisfies one or more criteria (e.g., is below a displacement threshold). In some implementations, the reduced displacement within the subsurface representation may be acceptable based on the subsurface representation not including any displacement. That is, the reinitialization of the subsurface representation may be repeated until there is no displacement within the subsurface representation.

In some implementations, contacting forces between different subsurface geological formations may be simulated to change the stress field and the displacement within the subsurface representation. For example, horizontal contacts between the subsurface geological formations (e.g., bedding planes) and the vertical contacts along fault(s) may be activated to simulated how the interaction between the subsurface geological formations affect the stress field and the displacement of the subsurface geological formations.

In some implementations, a material simulated within the subsurface representation may be changed from a linear material to a non-linear material for the reinitialization of the subsurface representation. A linear material may have a linear relationship between amount of change in shape/displacement and the amount of applied force. Changes to a linear material may be rate independent (e.g., changes independent of the rate at which force is applied). A linear material may include an elastic material. The elastic material within the subsurface representation provide simplified representation of the materials within the subsurface geological formations. The elastic material may temporarily change shape under load, and the original shape of the elastic material may be restored once the load is removed.

A non-linear material may have a non-linear relationship between amount of change in shape/displacement and the amount of applied force. A linear material may have a linear relationship between amount of change in shape/displacement and the amount of applied force. Changes to a non-linear material may be rate dependent (e.g., changes dependent on the rate at which force is applied). A non-linear material may include an elastoplastic and/or a plastic material. The elastoplastic/plastic material within the subsurface representation may provide more realistic representation of the materials within the subsurface geological formations. The elastoplastic/plastic material may permanently change shape under load, and the original shape of the elastic material may not be restored once the load is removed. For example, elastoplastic/plastic material may simulate rock that may be compacted through loading, with the rock having permanent deformation due to the loading (little or no springing back towards original shape once load is removed).

Figure 3B:
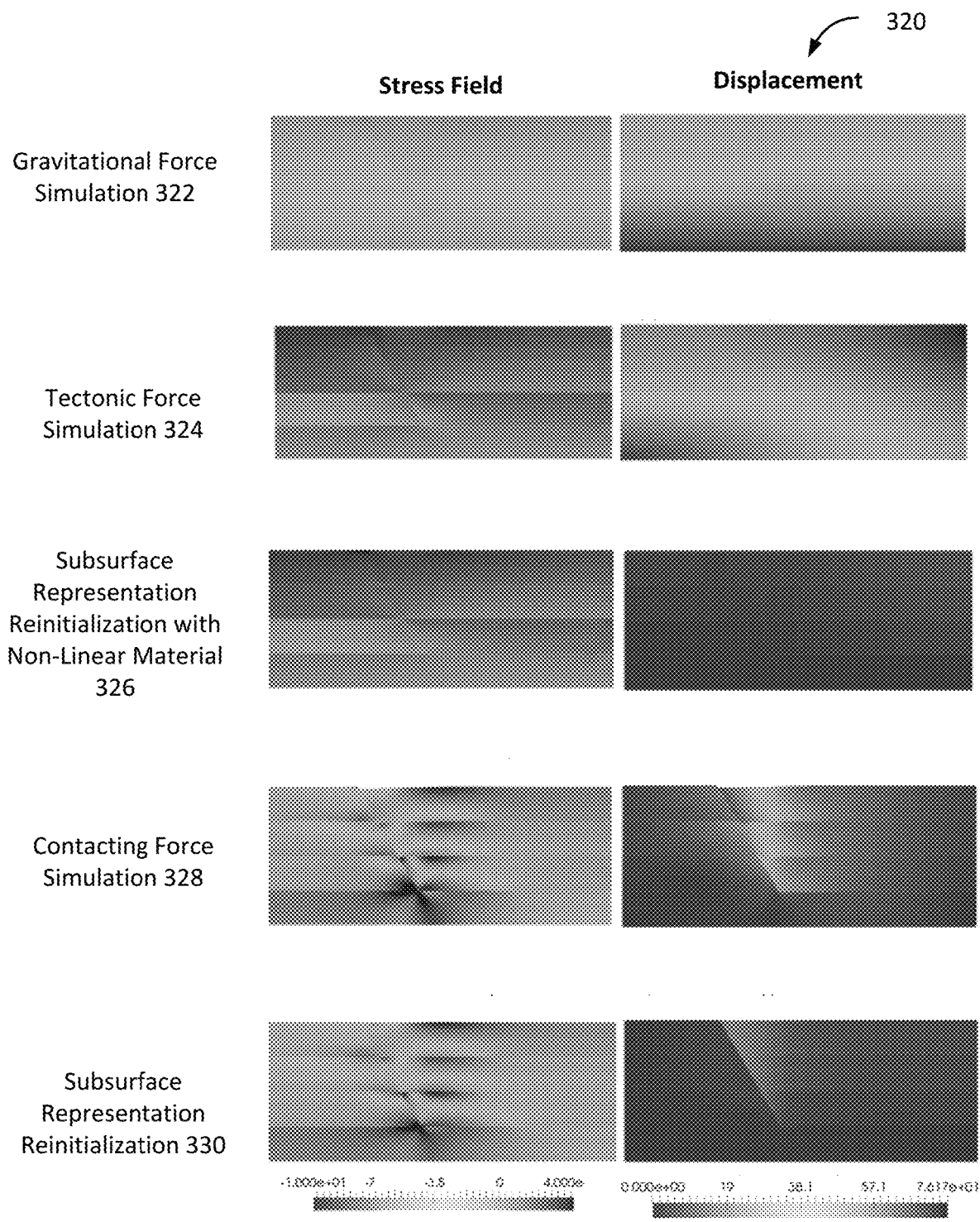

FIG. 3B illustrates example changes in stress field and displacement within a subsurface representation. The subsurface representation may include four geological formations (e.g., layers of rock), with a fault running through the top three geological formations. Contacts between the subsurface geological formations may include horizontal contacts between the four geological formations (e.g., bedding planes) and the vertical contacts along the fault. Gravitational force simulation 322 may be performed on the subsurface representation with bonded contacts to cause a stress field and a displacement within the subsurface representation. Tectonic force simulation 324 may be performed on the subsurface representation with bonded contacts to change the stress field and the displacement within the subsurface representation. The gravitational force simulation 322 and the tectonic force simulation 324 may be performed using linear/elastic material properties.

Subsurface representation reinitialization with non-linear material 326 may be performed to reset the displacement within the subsurface representation while maintaining the stress field within the subsurface representation. The subsurface representation reinitialization may be performed by using non-linear/elastoplastic/plastic material properties. The displacement may be reset to restore the original configuration of the subsurface geological formations. The stress within the subsurface representation may be set to zero, and the value of the stress at different locations within the subsurface representation may be increased back to the values of the stress field (values of the stress field after the gravitation force simulation 322 and the tectonic force simulation 324). The rate at which the values of the stress field is increased may be controlled to avoid violation of the strength profile of the non-linear/elastoplastic/plastic material properties. If the strength of the material is too weak for the values of the stress field calculated after gravitational force and tectonic force simulation, the material and/or the strength of the material may be altered to enable the subsurface representation to converge. Strain and porosity of the subsurface materials may be reset (values set to zero and then increased to their values prior to gravitational force simulation 322). At this stage, contacts between the subsurface geological formations may be deactivated and the subsurface representation may not include simulation of the contacts (e.g., no slip along fault).

Contacting force simulation 328 may be performed to activate the contacts between the subsurface geological formations (fault and bedding plane). Contacting force simulation 328 may simulate stress and/or forces on contact surfaces of the subsurface geological formations. Stresses and/or forces within the geological formations may be adjusted to bring the geological formations into equilibrium. To simulate contacting forces, the values of the stress field from the subsurface representation reinitialization with non-linear material 326 may be stored, and the displacement may be reset (returned to original configuration). The contact model may change changed from linear-elastic to non-linear to activate the contacts. The value of the stress at different locations within the subsurface representation may be increased back to the values of the stress field (values of the stress field after the subsurface representation reinitialization with non-linear material 326). The value of the stress may be ramped from zero (e.g., linear straight line curve, non-linear S-curve) while accounting for nonlinear contact slip (e.g., fault offset) and/or associated non-linear material behavior. The resulting stress field may be consistent with material state and fault friction angles. Contact stress release method may be used to recover consistency between contact stress and the displacement (modified mesh/grid coordinates).

Subsurface representation reinitialization 330 may be performed to reset the displacement within the subsurface representation while maintaining the stress field within the subsurface representation. The displacement may be reset to restore the original configuration of the subsurface geological formations. The stress within the subsurface representation may be set to zero, and the value of the stress at different locations within the subsurface representation may be increased back to the values of the stress field after contacting force simulation 328 while accounting for fault slip. Contact stress release method may be used to recover consistency between contact stress and the displacement (modified mesh/grid coordinates). The subsurface representation reinitialization 330 may be repeated until the reduced displacement within the subsurface representation is acceptable.

In some implementations, one or more salt materials may be simulated within the subsurface representation. For example, referring to FIG. 3B, for the gravitational force simulation 322, salt material properties may be used to simulate one or more salt rock layers. Salt behavior may be highly dependent on temperature, and a (realistic) temperature field may be applied to the subsurface representation to control a behavior of the salt material. For the tectonic force simulation 324, true geological lateral displacement rate may be estimated when applying lateral displacement/boundary condition. For the subsurface representation reinitialization 330, one or more properties of the salt material may be changed. For example, properties of the salt material may be changed to be production ready.

Figure 3C:
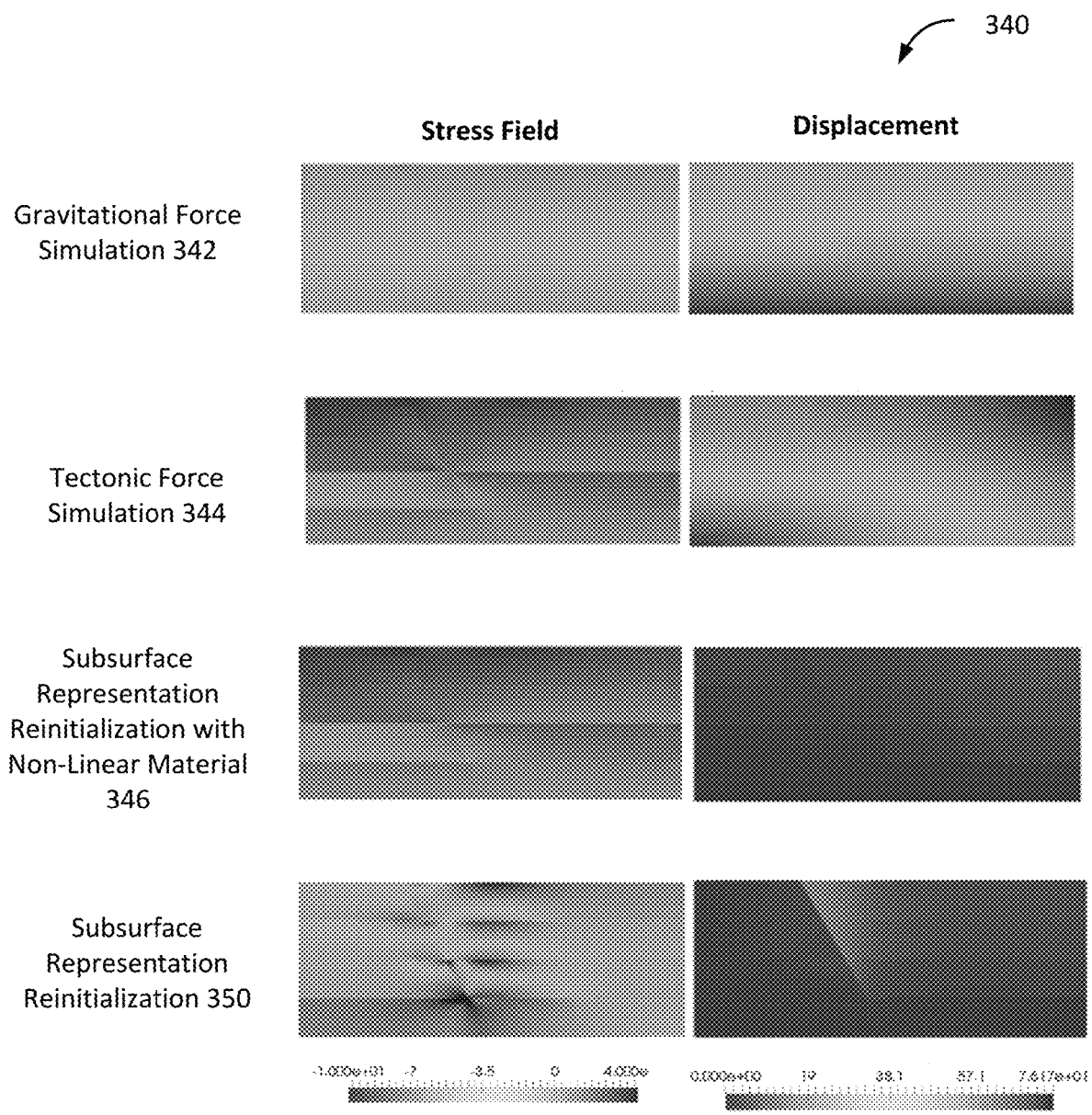

FIG. 3C illustrates example changes in stress field and displacement within a subsurface representation. The steps shown in FIG. 3C mirrors those shown in FIG. 3B, with the exception of the contacting force simulation 328. The steps shown in FIG. 3C may be used to simulate non-linear materials and no contacting forces between the subsurface geological formations. Gravitational force simulation 342 may be performed on the subsurface representation with bonded contacts to cause a stress field and a displacement within the subsurface representation. Tectonic force simulation 344 may be performed on the subsurface representation with bonded contacts to change the stress field and the displacement within the subsurface representation. Subsurface representation reinitialization with non-linear material 346 may be performed to reset the displacement within the subsurface representation while maintaining the stress field within the subsurface representation. Subsurface representation reinitialization 350 may be performed to reset the displacement within the subsurface representation while maintaining the stress field within the subsurface representation.

Figure 4:
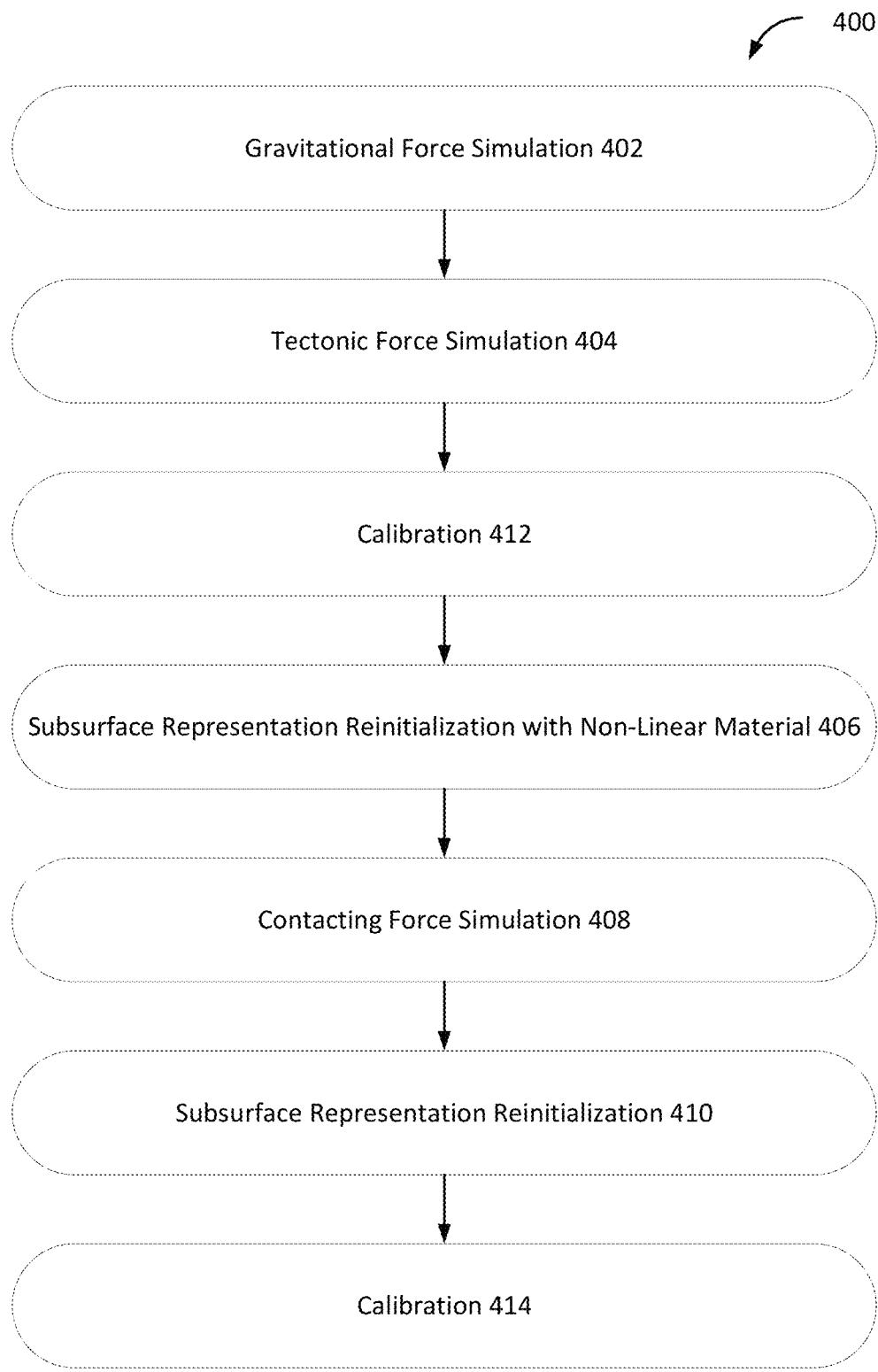
FIG. 4 illustrates an example flow chart for modeling subsurface characteristics.

FIG. 4 illustrates an example flow chart 400 for modeling subsurface characteristics. The flow chart 400 may start with a gravitational force simulation 402 on a subsurface representation. The gravitational force simulation 402 may causes a stress field and a displacement within the subsurface representation. A tectonic force simulation 404 may be applied to change the stress field and the displacement within the subsurface representation. Calibration 412 may be performed based on a comparison of the stress field within the subsurface representation and a desired stress field. Subsurface representation reinitialization with non-linear material 406 may be performed to reset the displacement within the subsurface representation while maintaining the stress field within the subsurface representation. Contacting force simulation 408 may be applied to activate the contacts in the subsurface representation. Subsurface representation reinitialization 100 may be performed to reset the displacement within the subsurface representation while maintaining the stress field within the subsurface representation. Calibration 414 may be performed based on a comparison of the stress field within the subsurface representation and a desired stress field.

In some implementations, changes in stress and/or one or more properties of the subsurface geological formations may be modeled using the pre-production stress state of the subsurface geological formations and/or other information. The pre-production stress state of the subsurface geological formations (e.g., values of the stress after reinitialization of the subsurface representation, reinitialized subsurface representation) may be used as a snapshot of the pre-production state of the subsurface geological formations. Different conditions may be applied to simulate how stress changes within the subsurface geological formations from the pre-production state. The pre-production stress state may be used as initial condition for modeling subsurface behavior, such as modeling how stress within the subsurface geological formations changes due to change in pore pressure during production.

The pre-production stress state may be used in Mechanical Earth Modeling (MEM) to simulate/forecast subsurface characteristics. For example, pre-production stress state may be used in MEM to forecast sub-surface stress, strain, displacement, and rock failure before, during and after production. The pre-production stress state may be used in MEM to perform analysis for variety of applications.

For example, for sub-surface Integrity (SSI), MEM may be used to evaluate the potential for SSI events, such as fault reactivation, reservoir compaction, large seabed/ground subsidence or slip of bedding planes that may affect wellbore integrity. For drilling, stresses calculated from MEM may be used to assess wellbore stability for wells to be drilled pre-production or after depletion. For completions, stress orientations and magnitudes from MEM, both pre-production and after depletion, may be used for completion design. Applications in this area include hydraulic fracturing design, evaluation of casing/cement stability, analysis of screen collapse, analysis of sanding potential, and evaluation of fracture connectivity with the wellbore. For reservoir planning, changes of stress magnitudes and orientations predicted by MEM may be used to evaluate production plans and drilling schedules. For example, if it is observed that depletion may significantly reduce the safe mud weight window, future wells may be moved earlier on the drilling schedule. MEM predictions of reservoir compaction and porosity loss may also be used for reservoir planning. For surveillance and monitoring, MEM may be used to evaluate the impact that stress/strain changes due to production may have on the seismic response of the reservoirs and overburden. Such evaluation may assist in designing future 4D seismic surveys and selecting their proper timing. For reservoir quality evaluation, stress calculated by MEM may provide additional input to reservoir quality (porosity and permeability) evaluations. 3D/4D MEM may provide full effective stress tensors that take into account structural and tectonic effects (e.g., proximity to salt or to faults). In some implementations, these improved stress calculations may be used to refine/improve porosity predictions. For sub-sea facilities, seabed subsidence and shallow fault reactivation prediction may be used to guide the placement of sub-sea facilities, pipelines, and other sub-sea equipment to reduce the risks associated with ground movement. Other applications are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be separate from and/or be part of one or more components of the system 10. The processor 11 may be configured to execute one or more components by software; hardware; firmware; some combination of software, hardware, and/or firmware; and/or other mechanisms for configuring processing capabilities on the processor 11.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
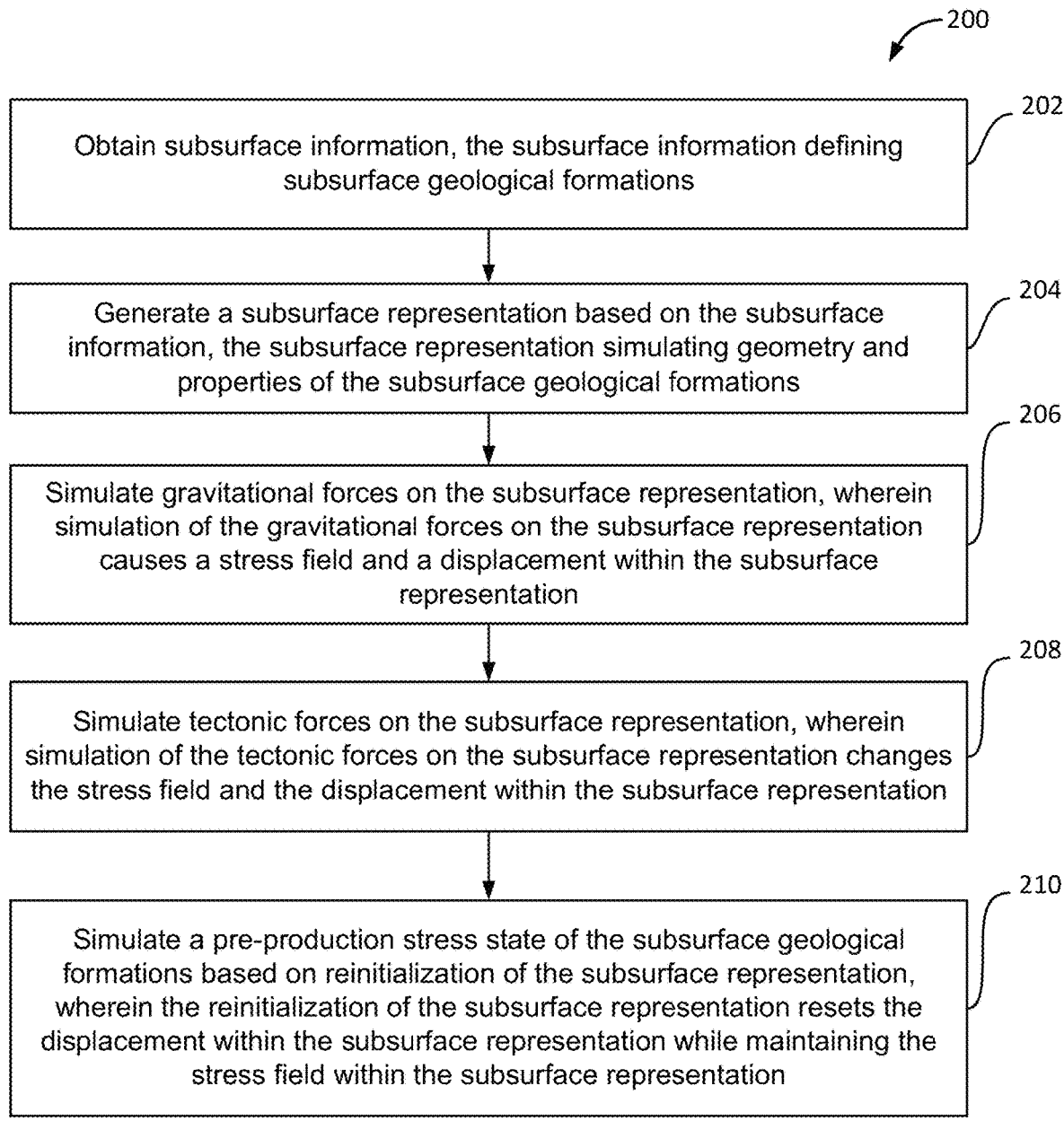
FIG. 2 illustrates an example method for modeling subsurface characteristics.

FIG. 2 illustrates method 200 for modeling subsurface characteristics. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operations of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 202, subsurface information may be obtained. The subsurface information may define subsurface geological formations. In some implementation, operation 202 may be performed by a processor component the same as or similar to the subsurface information component 102 (Shown in FIG. 1 and described herein).

At operation 204, a subsurface representation may be generated based on the subsurface information. The subsurface representation may simulate geometry and properties of the subsurface geological formations. In some implementation, operation 204 may be performed by a processor component the same as or similar to the subsurface representation component 104 (Shown in FIG. 1 and described herein).

At operation 206, gravitational forces may be simulated on the subsurface representation. Simulation of the gravitational forces on the subsurface representation may cause a stress field and a displacement within the subsurface representation. In some implementation, operation 206 may be performed by a processor component the same as or similar to the gravitational force component 106 (Shown in FIG. 1 and described herein).

At operation 208, tectonic forces may be simulated on the subsurface representation. Simulation of the tectonic forces on the subsurface representation may change the stress field and the displacement within the subsurface representation. In some implementation, operation 208 may be performed by a processor component the same as or similar to the tectonic force component 108 (Shown in FIG. 1 and described herein).

At operation 210, a pre-production stress state of the subsurface geological formations may be simulated based on reinitialization of the subsurface representation. The reinitialization of the subsurface representation may reset the displacement within the subsurface representation while maintaining the stress field within the subsurface representation. In some implementation, operation 210 may be performed by a processor component the same as or similar to the reinitialization component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for modeling subsurface characteristics, the system comprising:
one or more physical processors configured by machine-readable instructions to:
obtain subsurface information, the subsurface information defining subsurface geological formations;
generate a subsurface representation based on the subsurface information, the subsurface representation simulating geometry and properties of the subsurface geological formations;
simulate gravitational forces on the subsurface representation, wherein simulation of the gravitational forces on the subsurface representation causes a stress field and an artificial displacement within the subsurface representation;
simulate tectonic forces on the subsurface representation, wherein simulation of the tectonic forces on the subsurface representation changes the stress field and the artificial displacement within the subsurface representation; and
simulate an initial stress state of the subsurface geological formations based on reinitialization of the subsurface representation, wherein the reinitialization of the subsurface representation includes:
modifying the subsurface representation to restore the geometry of the subsurface representation that existed before the simulations of the gravitational forces and the tectonic forces on the subsurface representation via removal of the artificial displacement within the subsurface representation, wherein the removal the artificial displacement within the subsurface representation results in the subsurface representation simulating the geometry of the subsurface geological formations;
removing from the subsurface representation the stress field caused by the simulations of the gravitational forces and the tectonic forces on the subsurface representation; and
increasing values of stress at different locations within the subsurface representation back to values of the stress field caused by the simulations of the gravitational forces and the tectonic forces on the subsurface representation;
wherein resulting stress field within the reinitialized subsurface representation simulates the initial stress state of the subsurface geological formations via removal of the artificial displacement of the subsurface geological formations caused by the simulations of the gravitational forces and the tectonic forces and use of the stress field caused by the simulations of the gravitational forces and the tectonic forces.

2. The system of claim 1, wherein a calibration of the subsurface representation is performed based on a comparison of the stress field within the subsurface representation and a desired stress field.

3. The system of claim 1, wherein at least some of the artificial displacement within the subsurface representation remains after an initial reinitialization of the subsurface representation, the artificial displacement remaining within the subsurface representation caused by the subsurface representation reaching equilibrium during the initial reinitialization of the subsurface representation, and the reinitialization of the subsurface representation is repeated until the artificial displacement remaining within the subsurface representation is below a displacement threshold, wherein the reinitialization of the subsurface representation includes:
modifying the subsurface representation to restore the geometry of the subsurface representation via removal of the artificial displacement remaining within the subsurface representation, wherein the removal of the artificial displacement remaining within the subsurface representation results in the subsurface representation simulating the geometry of the subsurface geological formations;
removing from the subsurface representation the resulting stress field from an earlier reinitialization of the subsurface representation; and
increasing the values of stress at the different locations within the subsurface representation back to values of the resulting stress field from the earlier reinitialization of the subsurface representation.

4. The system of claim 1, wherein at least some of the artificial displacement within the subsurface representation remains after an initial reinitialization of the subsurface representation, the artificial displacement remaining within the subsurface representation caused by the subsurface representation reaching equilibrium during the initial reinitialization of the subsurface representation, and the reinitialization of the subsurface representation is repeated until the subsurface representation does not include any artificial displacement, wherein the reinitialization of the subsurface representation includes:
modifying the subsurface representation to restore the geometry of the subsurface representation via removal of the artificial displacement remaining within the subsurface representation, wherein the removal of the artificial displacement remaining within the subsurface representation results in the subsurface representation simulating the geometry of the subsurface geological formations;
removing from the subsurface representation the resulting stress field from an earlier reinitialization of the subsurface representation; and
increasing the values of stress at the different locations within the subsurface representation back to values of the resulting stress field from the earlier reinitialization of the subsurface representation.

5. The system of claim 1, wherein a material simulated within the subsurface representation is changed from a linear material to a non-linear material for the reinitialization of the subsurface representation.

6. The system of claim 5, wherein contacting forces between different subsurface geological formations are simulated to change the stress field and the artificial displacement within the subsurface representation.

7. The system of claim 1, wherein a salt material is simulated within the subsurface representation, and a temperature field is applied to the subsurface representation to control a behavior of the salt material.

8. The system of claim 1, wherein changes in stress and/or one or more of the properties of the subsurface geological formations are modeled using the initial stress state of the subsurface geological formations.

9. A method for modeling subsurface characteristics, the method comprising:
obtaining subsurface information, the subsurface information defining subsurface geological formations;
generating a subsurface representation based on the subsurface information, the subsurface representation simulating geometry and properties of the subsurface geological formations;
simulating gravitational forces on the subsurface representation, wherein simulation of the gravitational forces on the subsurface representation causes a stress field and an artificial displacement within the subsurface representation;
simulating tectonic forces on the subsurface representation, wherein simulation of the tectonic forces on the subsurface representation changes the stress field and the artificial displacement within the subsurface representation; and
simulating an initial stress state of the subsurface geological formations based on reinitialization of the subsurface representation, wherein the reinitialization of the subsurface representation includes:
modifying the subsurface representation to restore the geometry of the subsurface representation that existed before the simulations of the gravitational forces and the tectonic forces on the subsurface representation via removal of the artificial displacement within the subsurface representation, wherein the removal the artificial displacement within the subsurface representation results in the subsurface representation simulating the geometry of the subsurface geological formations;
removing from the subsurface representation the stress field caused by the simulations of the gravitational forces and the tectonic forces on the subsurface representation; and
increasing values of stress at different locations within the subsurface representation back to values of the stress field caused by the simulations of the gravitational forces and the tectonic forces on the subsurface representation;
wherein resulting stress field within the reinitialized subsurface representation simulates the initial stress state of the subsurface geological formations via removal of the artificial displacement of the subsurface geological formations caused by the simulations of the gravitational forces and the tectonic forces and use of the stress field caused by the simulations of the gravitational forces and the tectonic forces.

10. The method of claim 9, wherein a calibration of the subsurface representation is performed based on a comparison of the stress field within the subsurface representation and a desired stress field.

11. The method of claim 9, wherein at least some of the artificial displacement within the subsurface representation remains after an initial reinitialization of the subsurface representation, the artificial displacement remaining within the subsurface representation caused by the subsurface representation reaching equilibrium during the initial reinitialization of the subsurface representation, and the reinitialization of the subsurface representation is repeated until the artificial displacement remaining within the subsurface representation is below a displacement threshold, wherein the reinitialization of the subsurface representation includes:
modifying the subsurface representation to restore the geometry of the subsurface representation via removal of the artificial displacement remaining within the subsurface representation, wherein the removal of the artificial displacement remaining within the subsurface representation results in the subsurface representation simulating the geometry of the subsurface geological formations;
removing from the subsurface representation the resulting stress field from an earlier reinitialization of the subsurface representation; and
increasing the values of stress at the different locations within the subsurface representation back to values of the resulting stress field from the earlier reinitialization of the subsurface representation.

12. The method of claim 9, wherein at least some of the artificial displacement within the subsurface representation remains after an initial reinitialization of the subsurface representation, the artificial displacement remaining within the subsurface representation caused by the subsurface representation reaching equilibrium during the initial reinitialization of the subsurface representation, and the reinitialization of the subsurface representation is repeated until the subsurface representation does not include any artificial displacement, wherein the reinitialization of the subsurface representation includes:

modifying the subsurface representation to restore the geometry of the subsurface representation via removal of the artificial displacement remaining within the subsurface representation, wherein the removal of the artificial displacement remaining within the subsurface representation results in the subsurface representation simulating the geometry of the subsurface geological formations;

removing from the subsurface representation the resulting stress field from an earlier reinitialization of the subsurface representation; and increasing the values of stress at the different locations within the subsurface representation back to values of the resulting stress field from the earlier reinitialization of the subsurface representation.

13. The method of claim 9, wherein a material simulated within the subsurface representation is changed from a linear material to a non-linear material for the reinitialization of the subsurface representation.

14. The method of claim 13, wherein contacting forces between different subsurface geological formations are simulated to change the stress field and the artificial displacement within the subsurface representation.

15. The method of claim 9, wherein a salt material is simulated within the subsurface representation, and a temperature field is applied to the subsurface representation to control a behavior of the salt material.

16. The method of claim 9, wherein changes in stress and/or one or more of the properties of the subsurface geological formations are modeled using the initial stress state of the subsurface geological formations.

* * * * *